Nov. 29, 1932.  E. W. LITTLE  1,889,677
WELDING MEANS
Filed March 8, 1930  3 Sheets-Sheet 2

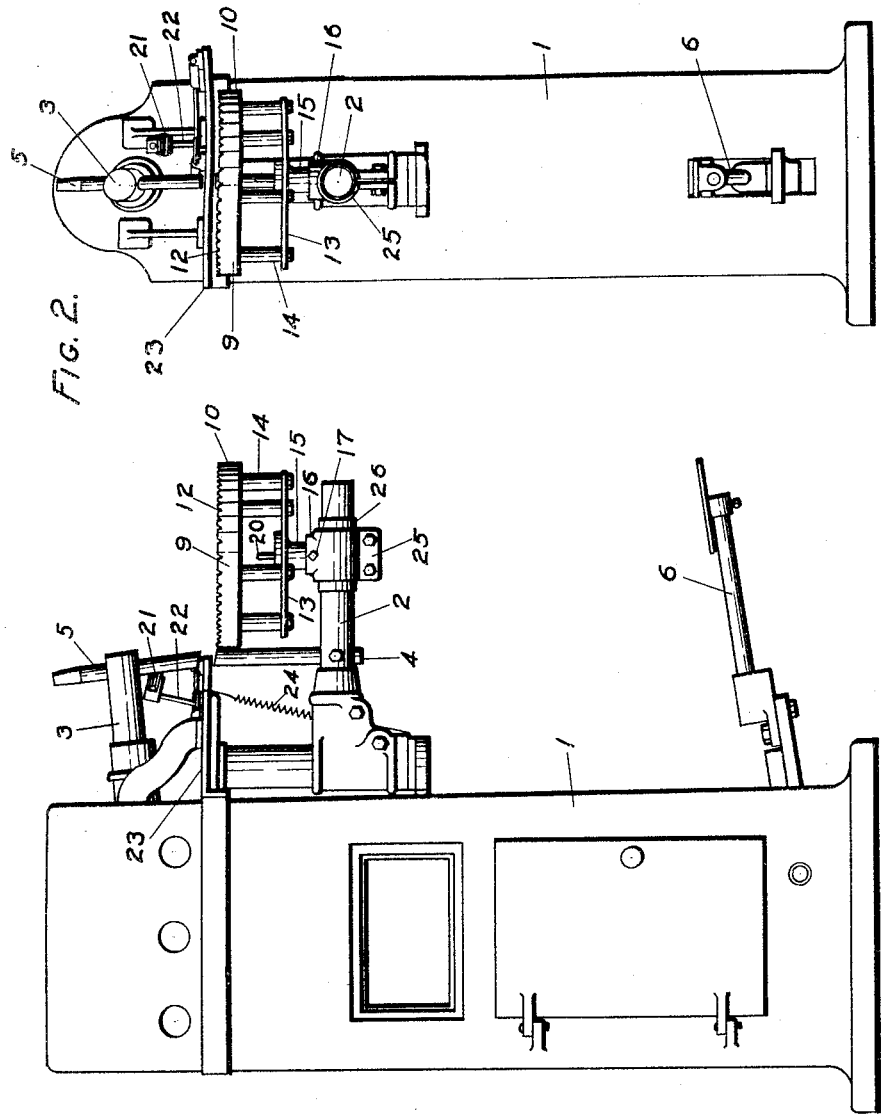

Inventor
EARL W. LITTLE
By Owen H. Spencer
Attorney

Nov. 29, 1932. E. W. LITTLE 1,889,677
WELDING MEANS
Filed March 8, 1930 3 Sheets-Sheet 3
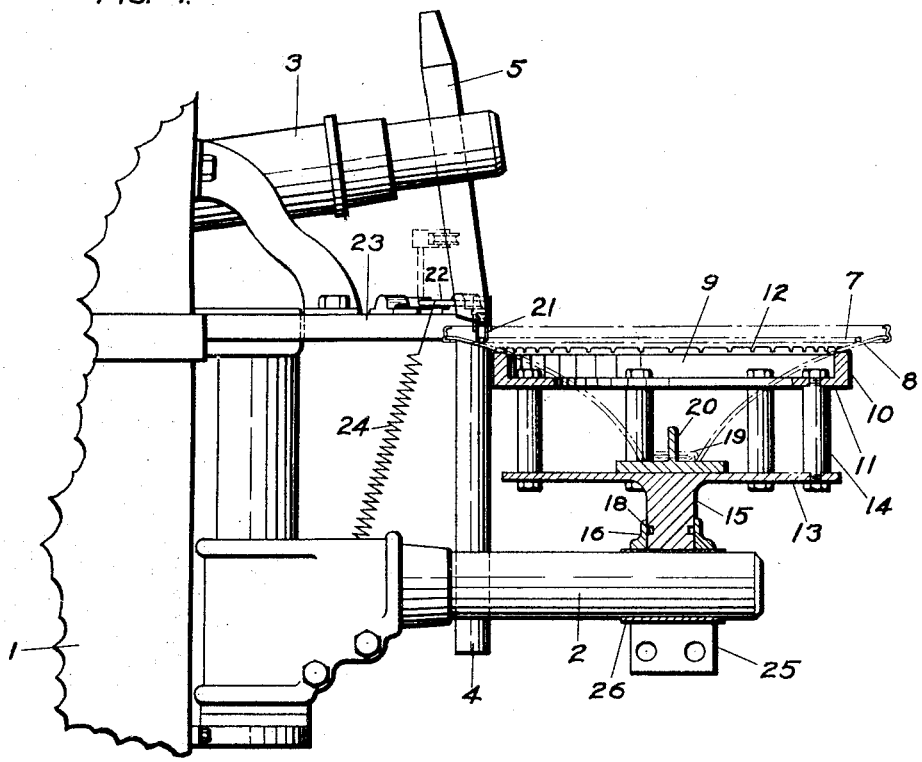
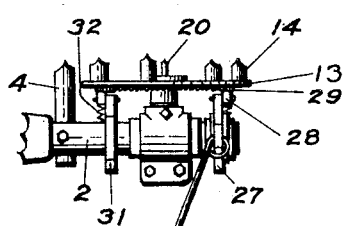
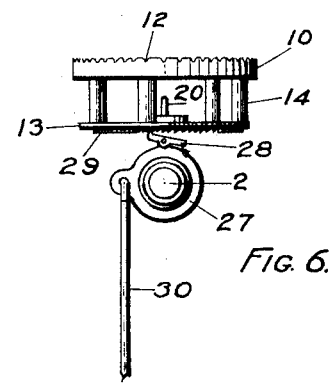
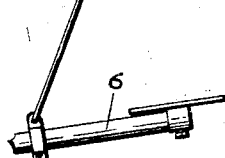
Inventor
EARL W. LITTLE
By Owen H. Spencer
Attorney Patented Nov. 29, 1932

1,889,677

UNITED STATES PATENT OFFICE

EARL W. LITTLE, OF INDIANAPOLIS, INDIANA

WELDING MEANS

Application filed March 3, 1930. Serial No. 434,188.

This invention relates to welding means and is designed primarily for assembling the top portion of a cage structure and one feature of the invention is the provision of a form for receiving the cage top and support the same in position for parts thereof to be welded together.

A further feature of the invention is the provision of means for rotatably mounting the form in juxtaposition to a welding machine so that by rotating the form successive wires may be brought into position between the electrodes of the welding machine.

A further feature of the invention is the provision of means for guiding a band forming wire over the main wires of the cage top during the welding operation.

A further feature of the invention is the provision of means for spacing the main wires of the cage top and holding the same in spaced relation during the welding operation.

A further feature of the invention is the provision of means for automatically rotating the form for bringing the wires in position to be engaged with the welding electrodes.

A further feature of the invention is the provision of means for accurately centering the assemblage of top forming wires on the form.

Other objects and advantages will be hereinafter more fully set forth and pointed out in the accompanying specification.

In the accompanying drawings which are made a part of this application,

Figure 1 is a side elevation of a welding machine with the form mechanism attached thereto.

Figure 2 is a front elevation thereof.

Figure 4 is an enlarged side elevation of a portion of a welding machine with the form shown in section and the cage top shown by dotted lines.

Figure 5 is a detail side elevation showing an automatic means for rotating the form, and, Figure 6 is a front elevation thereof.

Figure 3:
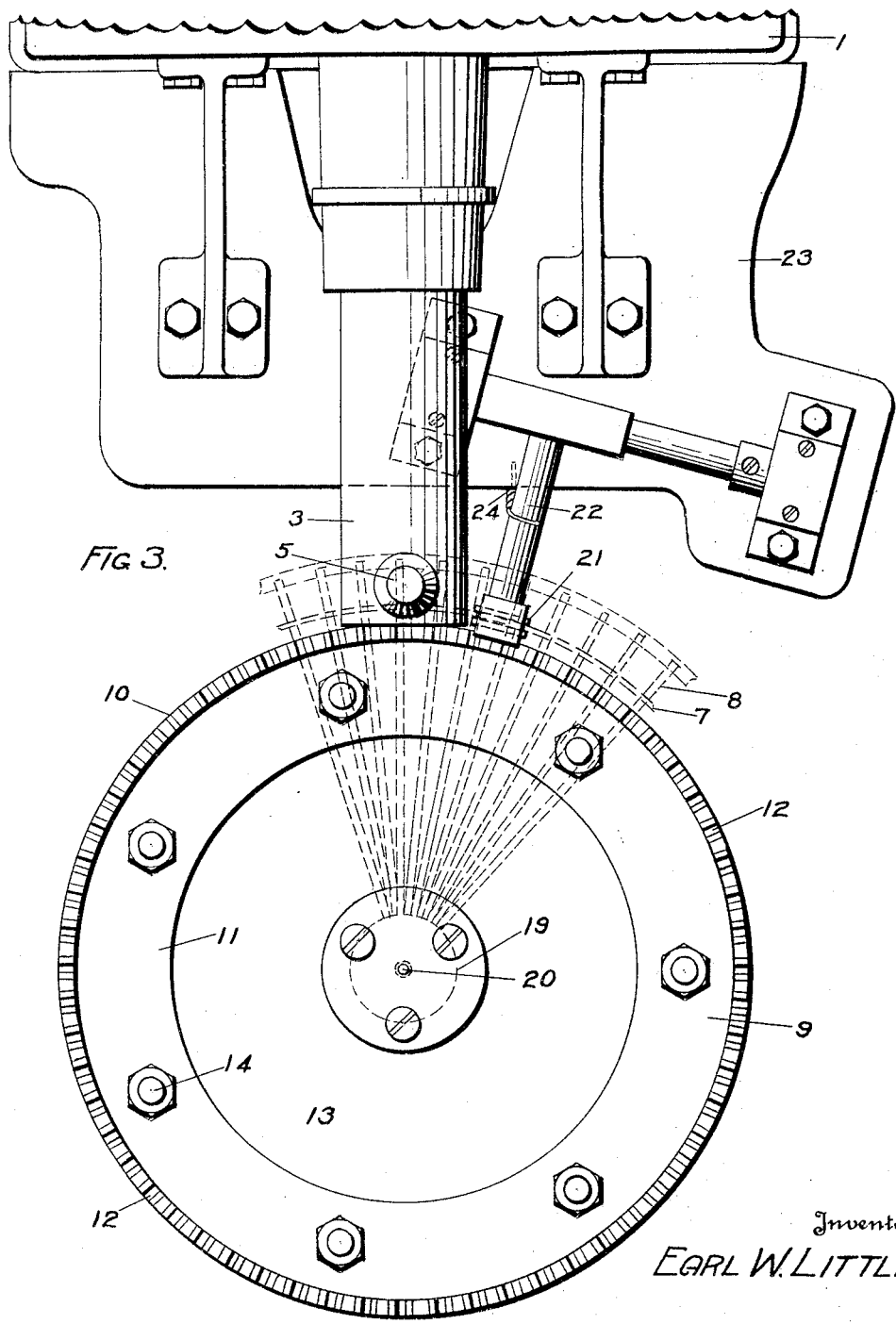
Figure 3 is an enlarged top plan view of the form mechanism showing its relative position with respect to the welding machine.

Referring to the drawings in which similar reference numerals designate corresponding parts throughout the several views, the numeral 1 designates a welding machine, which may be of any preferred type, having a stationary arm 2 and a swinging arm 3, said arms carrying respectively, electrodes 4 and 5, adapted to be brought together to form a spot weld, and 6 indicates the usual form or lever for swinging the arm 3 towards the arm 2.

In the manufacture of certain types of cage tops, such as the Japanese type, it is necessary to secure a bracing member to each one of the radial wires forming the top and in order to accomplish this result with the least expense, a metal band 7 preferably of wire, is welded to each of the radial wires 8 of the top proper, and in order to support the top in position to rapidly and positively perform this operation, a form 9 is provided in which the cage top rests while being welded.

The form 9 comprises a vertical wall 10 having a horizontal flange 11 integral with the lower edge thereof, the top edge of the wall 10 having a plurality of notches 12 into which the wires 8 are placed for positioning said wires in uniform spaced relation. The ring like form 9 is supported from a base 13 by means of posts 14, said base having a central shank 15 which enters a socket 16, a binding bolt 17 passing through the side wall of the socket with the inner end entering a groove 18 encircling the shank 15, the bolt preventing the shank casually leaving the socket and at the same time, permitting rotation of the shank and form mounted thereon.

The wires 8 are first assembled around an anchoring plate 19 and secured in fixed relation therewith and as the top is somewhat cone shaped, the plate 19 is extended downwardly through the opening in the flange 11 and engaged with a stud 20 at the center of the base 13, thus centering the top with the form 9.

The band 7 is preferably located inwardly from the free ends of the wires 8 and by forming the vertical wall 10 of such a diameter that it will rest in close proximity to the band 7, the wires 8 will be held very rigid during the welding operation.

The band 7 may be formed endless, but it preferably consists of a circle of wire, one end of which is first welded to one of the wires 8, after which, the next succeeding wire 8 is brought to position between the electrodes 4 and 5 by rotating the form 9, when the welding operation is repeated, these operations being continued until the band has been welded to all the wires, or such of them as may be necessary. In order to properly guide the band 7, so that it will aline with the electrodes, as the form 9 is rotated, a channeled roller 21 is mounted on the end of an arm 22, which is in turn pivoted on a platform 23, projecting from the face of the welding machine 1. The roller 21 is held in engagement with the bond 7 by means of a spring 24, one end of which hooks over the arm 22, so that when the roller is not in use, the spring 24 may be released therefrom and the arm swung upwardly and inwardly, the spring, in this instance, being hooked over the edge of the platform 23.

Any suitable supporting means may be provided for the form 9, but for convenience, the socket 16 is terminated in a split collar 25, which is introduced and clamped around the arm 2 of the welding machine, and a suitable insulating substance 26 is introduced between the arm and collar.

The form 9 may be manually rotated for successively bringing the wires 8 in registration with the electrodes 4 and 5, but in Figs. 5 and 6, means is shown for automatically rotating the form 9 to successively bring the wires 8 in registration with said electrodes, which consists in rotatably mounting a bell crank lever 27 on the arm 2, at the upper end of which is pivotally mounted a spring pressed latch 28, for cooperation with a circular row of teeth 29 on the bottom of the base 13. The other arm of the bell crank lever 27 has a rod 30 attached thereto, which rod has its opposite end attached to lever 6, so that when said lever is depressed to form a weld, the bell crank lever 27 will be rocked to move the latch 28 into engagement with the next succeeding tooth 29, whereby when the lever 6 moves upwardly to its initial position, the form 9 will be rotated to bring the next succeeding wire 8 into position between said electrodes.

To prevent reverse rotation of the form 9, as when the latch 28 is being moved into engagement with the next succeeding tooth, a post 31 is attached to the arm 2, to the upper end of which is pivotally attached a spring pressed latch 32, which successively engages the teeth 29, as the form 9 is rotated, to prevent reverse rotation of the form 9.

While I have shown the welding machine provided with punch-like electrodes, it will be understood that any other suitable form of electrodes may be used, such as the well known roller type.

In operation, the assembled wires 8 are positioned over the form 9, with each wire in its respective notch 12 and with the anchoring plate 19 engaging the stud 20. The band 7 is then positioned over the wires 8 and the arm 22 then swung downwardly until the roller 21 engages the band 7, when the spring 24 is engaged with the arm 22 for holding the roller in engagement with the band, so that as the form is rotated, the band 7 will be guided into the path of the electrodes. Downward pressure is then directed against the lever 6, which lowers the arm 3 and engages the electrode 5 with the band 7 and as the electrode 4 is resting against the wire 8 in registration with the electrodes, this action directs an electric current through the band and wire and forms a weld. When the pressure is released from the lever 6, said lever moves upwardly and rotates the form 9 and wires 8 until the next succeeding wire 8 is moved to position between the electrodes, when by again depressing the lever 6, another weld is formed.

What I claim is:

1. Means for supporting an assemblage of wires in position to be welded comprising a form structure, means for centering the assemblage of wires for causing them to radiate from the center of said form and project over the edge of the form, and means on the form for holding said wires in spaced relation.

2. A device for supporting the wires of a cage top of the Japanese type, comprising a circular form upon which the top is to be positioned with the wires of the top radiating from the center of the form and projecting over the edge of the frame, and means for centering the top on the form.

3. A device for supporting the wires of a cage top comprising a vertically disposed form upon which the top is to be rested, the wires of the top extending over the top edge of the form, means for spacing the wires forming the top, and means for centering the top with the form.

4. The combination with a welding machine having electrodes, of means serving to support a cage top in position and parts of the top in position to be welded together so as to be engaged by said electrodes, comprising a circular flange member, said member having notches which receive and locate the cage top parts, a stud serving to center the cage top with respect to said member and means serving to automatically rotate said supporting means and serving to successively position parts of the top between said electrodes.

5. A means for supporting a cage forming top in position to be welded together comprising a ring like form having a flange and a cylindrical wall positioned substantially at right angles thereto, means for centralizing an assemblage of radially arranged top forming wires which tend to converge at the central portion of the assemblage, said centralizing means serving to bring said central portion central with said form, means for retaining the free ends of said wires in spaced relation during the welding operation, and means for welding the free ends of said wires to a circular cage forming part, in uniform succession.

6. A means for supporting wires for forming a cage top in position to be welded together comprising a circular form, means for centering an assemblage of radially arranged wires with the form, means for retaining the assemblage of wires in spaced radial relation during the welding operation, and means for rotatably mounting said form.

7. The combination with parts of a welding machine, of a form serving to support an assemblage of wires in position to be welded together, said form comprising a horizontal flange and a wall around the edge thereof, and means serving to rotatably mount said form on the welding machine parts.

8. The combination with parts of a welding machine, of a substantially cup like form serving to support an assemblage of wires, means serving to mount the wires, and means embodied therewith serving to locate said wires in radiating position from the center of said form and over the edge thereof.

9. Means serving to support an assemblage of wires in position to be welded comprising a substantially cup like form, means serving to mount the assemblage of wires thereon and means embodied therewith serving to locate said wires in radiating positions from the center of said form and extend over the edge thereof.

In testimony whereof, I have hereunto set my hand on this the 26th day of February, 1930.

EARL W. LITTLE.